United States Patent
Willis et al.

(10) Patent No.: US 9,451,322 B2
(45) Date of Patent: Sep. 20, 2016

(54) CLOUD COMPUTING SYSTEM AND METHOD BASED ON DISTRIBUTED CONSUMER ELECTRONIC DEVICES

(71) Applicant: LeoNovus USA, Sunnyvale, CA (US)

(72) Inventors: Daniel Willis, Sunnyvale, CA (US); Paul Master, Sunnyvale, CA (US); Gordon Campbell, Sunnyvale, CA (US); Sean O'Hagan, Ottawa (CA); Derek Noble, Ottawa (CA)

(73) Assignee: LeoNovus USA, Sunnyvale, CA (US)

( * ) Notice: Subject to any disclaimer, the term of this patent is extended or adjusted under 35 U.S.C. 154(b) by 174 days.

(21) Appl. No.: 14/260,688

(22) Filed: Apr. 24, 2014

(65) Prior Publication Data

US 2014/0325545 A1 Oct. 30, 2014

Related U.S. Application Data

(60) Provisional application No. 61/816,211, filed on Apr. 26, 2013.

(51) Int. Cl.
*H04N 21/442* (2011.01)
*H04N 21/643* (2011.01)
(Continued)

(52) U.S. Cl.
CPC .. *H04N 21/44204* (2013.01); *H04N 21/44231* (2013.01); *H04N 21/472* (2013.01); *H04N 21/6175* (2013.01); *H04N 21/64322* (2013.01)

(58) Field of Classification Search
CPC ................ H04N 21/64322; H04N 21/44204; H04N 21/6175
USPC ......... 725/14, 25, 36, 37; 709/219, 226, 236
See application file for complete search history.

(56) References Cited

U.S. PATENT DOCUMENTS 8,275,827 B2 * 9/2012 Hubbard ............... G06F 9/5044
709/201
2002/0184451 A1 12/2002 Dovi
(Continued)

FOREIGN PATENT DOCUMENTS

| WO | 2012042509 A1 | 4/2012 |
| WO | 2012051539 | 4/2012 |
| WO | 2013052601 A1 | 4/2013 |

OTHER PUBLICATIONS

"The State of Cloud Storage: 2013 Industry Report"—Nasuni Feb. 2013 http://www6.nasuni.com/rs/nasuni/images/nasuni-white-paper-state-of-cloud-storage-2013.pdf.*

(Continued)

*Primary Examiner* — Randy Scott
(74) *Attorney, Agent, or Firm* — Middleton Reutlinger

(57) ABSTRACT

In accordance with a method a plurality of subscriber systems are provided, the systems being coupled via a Wide Area Network (WAN) and comprising a first subscriber system. The first subscriber system has processing and non-volatile storage and is suitably programmed for providing a subscriber service to a first subscriber. The first system is disposed in an unsecured location, which is associated with the first subscriber. Subsequently, the subscriber service is provided to the first subscriber. Separately, a task is provided to the first subscriber system via the WAN and is executed on the first subscriber system. An activity record for the execution of the task is logged, based on an amount of at least one of the processing and the non-volatile storage consumed on the first subscriber system during execution of the task.

33 Claims, 7 Drawing Sheets

(51) Int. Cl.
*H04N 21/61* (2011.01)
*H04N 21/472* (2011.01)

(56) References Cited

U.S. PATENT DOCUMENTS

| | | |
|---|---|---|
| 2003/0046396 A1 | 3/2003 | Richter et al. |
| 2003/0174648 A1 | 9/2003 | Wang et al. |
| 2007/0124415 A1 | 5/2007 | Lev-Ran et al. |
| 2008/0154798 A1 | 6/2008 | Valz |
| 2008/0310408 A1 | 12/2008 | Thompson et al. |
| 2009/0007216 A1* | 1/2009 | Ku .................... H04N 7/17327 725/142 |
| 2009/0241150 A1* | 9/2009 | White .................... G06Q 30/00 725/91 |
| 2010/0058381 A1 | 3/2010 | Begeja et al. |
| 2010/0223378 A1 | 9/2010 | Wei |
| 2011/0016214 A1 | 1/2011 | Jackson |
| 2011/0145875 A1 | 6/2011 | Kim |
| 2011/0173328 A1 | 7/2011 | Park et al. |
| 2012/0151077 A1* | 6/2012 | Finster .................... G06F 21/10 709/231 |
| 2012/0266060 A1 | 10/2012 | Roberts et al. |
| 2012/0304169 A1 | 11/2012 | Anderson et al. |
| 2012/0307635 A1 | 12/2012 | Kahn et al. |
| 2013/0018999 A1 | 1/2013 | Merrill et al. |
| 2013/0024496 A1 | 1/2013 | Krishnan et al. |
| 2013/0104178 A1 | 4/2013 | Babu et al. |
| 2013/0110778 A1* | 5/2013 | Taylor ............... G06F 17/30215 707/624 |
| 2013/0124720 A1 | 5/2013 | Wood et al. |
| 2015/0020132 A1 | 1/2015 | Willis et al. |

OTHER PUBLICATIONS

International Search Report and Written Opinion for corresponding PCT Application No. PCT/US2014/035261 mailed Sep. 22, 2014.
Federal Institute of Industrial Property; International Search Report and Written Opinion; Dec. 4, 2014 for PCT/US2014/045995; pp. 1-8; Moscow, Russia.
Cornell University Library, arxiv.org; Kirby et al; An Approach to Ad hoc Cloud Computing; submitted Feb. 25, 2010; 7 pages; published at http://arxiv.org/pdf/1002.4738v1.pdf.

* cited by examiner

CLOUD COMPUTING SYSTEM AND METHOD BASED ON DISTRIBUTED CONSUMER ELECTRONIC DEVICES

This non-provisional application claims priority to and benefit under 35 U.S.C. §119(e) to U.S. Provisional Application No. 61/816,211 filed on Apr. 26, 2013, entitled "Cloud computing system and method based on distributed consumer electronic devices," the disclosure of which is incorporated by reference herein in its entirety.

FIELD OF THE INVENTION

The invention relates generally to cloud-based processing and storage of data, and more particularly to a method and system for providing cloud-based processing and storage of data using consumer electronic devices that are connected via a wide area network.

BACKGROUND OF THE INVENTION

Cloud-based processing and storage of data has been available for several years. Cloud-based systems, such as for instance Amazon® Web Services (AWS), provide online computing and storage services for other web sites or client-side applications. In such systems the computing and storage services are billed to the client based on usage, which has given rise to the concept of "Elastic Computing." Elastic Computing is the ability of a cloud service provider to provision flexible computing power when and wherever required. The elasticity of these resources can be in terms of processing power, storage, bandwidth, etc. Current systems, of which AWS is typical, are based on data centers that are distributed throughout the world, grouped into distinct regions for providing services therein. For instance, AWS is located in eight geographical regions including Northern Virginia (US East), Northern California (US West), Oregon (US West), Sao Palo (Brazil), Ireland, Singapore, Tokyo and Sydney. Each region has multiple "Availability Zones," which are distinct data centers providing AWS services. Availability Zones are isolated from each other to prevent outages from spreading between Zones.

Traditional cloud-based computing and storage systems suffer from a number of disadvantages. In particular, it is costly to purchase the hardware and other infrastructure, such as for instance buildings, power distribution systems, air-conditioning systems etc., that are required to set up a data center. Of course, these costs are repeated to establish each of the multiple data centers within multiple regions around the world. Further, the ongoing cost to maintain and operate each data center is high, with the cost of power for servers and cooling systems making up a significant and increasing portion of the total cost of ownership. Traditional systems are also susceptible to service outages, which may affect a significant number of users within a geographical region and result in financial losses for the cloud computing provider.

It would be beneficial to provide a method and system that overcomes at least some of the above-mentioned limitations of the prior art.

SUMMARY OF THE INVENTION

In accordance with an aspect of an embodiment of the invention, there is provided a method comprising: registering a plurality of subscribers to a content delivery service; for each registered subscriber providing at a location associated therewith a subscriber system, each of the subscriber systems coupled to a Wide Area Network (WAN) and comprising at least one of a processing resource and a non-volatile storage resource; delivering content to a first subscriber system via the WAN and in response to a content delivery request received from a first subscriber, thereby consuming a portion of the at least one of the processing resource and the non-volatile storage resource of the first subscriber system; receiving a task that is other than in accordance with the content delivery service; providing the task to the first subscriber system, the first subscriber system having an available portion of the at least one of the processing resource and the non-volatile storage resource that is sufficient to execute the task; executing the task on the first subscriber system; and logging an activity record for the execution of the task based on an amount of the available portion of the at least one of the processing resource and the non-volatile storage resource consumed during execution of the task, the logging optionally including invoicing to other than the first subscriber.

In accordance with an aspect of an embodiment of the invention, there is provided a system, comprising: a Wide Area Network (WAN); a plurality of subscriber systems coupled to the WAN, each subscriber system associated with a subscriber to a content delivery service and each subscriber system having an amount of an available resource that varies over time, the plurality of subscriber systems including a first subscriber system associated with a first subscriber, the first subscriber system supporting requesting by the first subscriber for delivery of content to the first subscriber system via the content delivery service; a client system coupled to the WAN for making a request for one of processing and data storage within the available resources of the plurality of subscriber systems and outside of resources of the client system, and a resource allocator for: receiving from the client system the request for one of processing and data storage; providing a task to the first subscriber system to be performed thereby, using a portion of the available resource thereof, the task based on the request that is received from the client system; coordinating delivery of a result of performing the task from the first subscriber system to the client system; and logging an activity record for the performing of the task in dependence upon the portion of the available resource that is consumed during performing the task.

In accordance with an aspect of an embodiment of the invention, there is provided a method comprising: providing a plurality of subscriber systems coupled via a Wide Area Network (WAN) and comprising a first subscriber system, the first subscriber system comprising processing and non-volatile storage and being suitably programmed for providing a subscriber service to a first subscriber; disposing the first system in an unsecured location, the unsecured location associated with the first subscriber; providing the subscriber service to the first subscriber; providing a task to the first subscriber system via the WAN; executing the task on the first subscriber system; and, logging an activity record for the execution of the task based on an amount of at least one of the processing and the non-volatile storage consumed on the first subscriber system during execution of the task.

In accordance with an aspect of an embodiment of the invention, there is provided a method comprising: registering a plurality of subscribers to a content delivery service; for each registered subscriber providing at a location associated therewith a subscriber system, each subscriber system coupled to a Wide Area Network (WAN) and comprising at least one of a processing resource and a non-volatile storage resource; delivering content to each subscriber system in accordance with the content delivery service, comprising providing data relating to the content delivery service to each subscriber system via the WAN and according to a first security protocol; providing a task to at least one of the subscriber systems, comprising: determining at least one subscriber system having a sufficient amount of the at least one of the processing resource and the non-volatile storage resource available to execute the task; and delivering task data to the at least one subscriber system, comprising providing the task data via the WAN and according to a second security protocol; and logging an activity record for the execution of the task based on an amount of the available portion of the at least one of the processing resource and the non-volatile storage resource that is consumed during execution of the task.

In accordance with an aspect of an embodiment of the invention, there is provided method comprising: registering a plurality of subscribers to a content delivery service; for each registered subscriber providing at a location associated therewith a subscriber system, each subscriber system coupled to a Wide Area Network (WAN) and comprising at least one of a processing resource and a non-volatile storage resource for providing the subscriber service to the subscriber, the subscriber service for being performed in a dedicated fashion by the at least one of a processing resource and a non-volatile storage resource; delivering content to each subscriber system in accordance with the content delivery service, comprising providing data relating to the content delivery service to each subscriber system via the WAN and according to a first security protocol and providing the subscriber service to each subscriber by an associated subscriber system; providing a task to at least one of the subscriber systems, comprising: determining at least one subscriber system having a sufficient amount of the at least one of the processing resource and the non-volatile storage resource available to execute the task; and delivering task data to the at least one subscriber system, comprising providing the task data via the WAN and according to a second security protocol; and logging an activity record for the execution of the task based on an amount of the available portion of the at least one of the processing resource and the non-volatile storage resource that is consumed during execution of the task.

BRIEF DESCRIPTION OF THE DRAWINGS

The instant invention will now be described by way of example only, and with reference to the attached drawings, wherein similar reference numerals denote similar elements throughout the several views, and in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
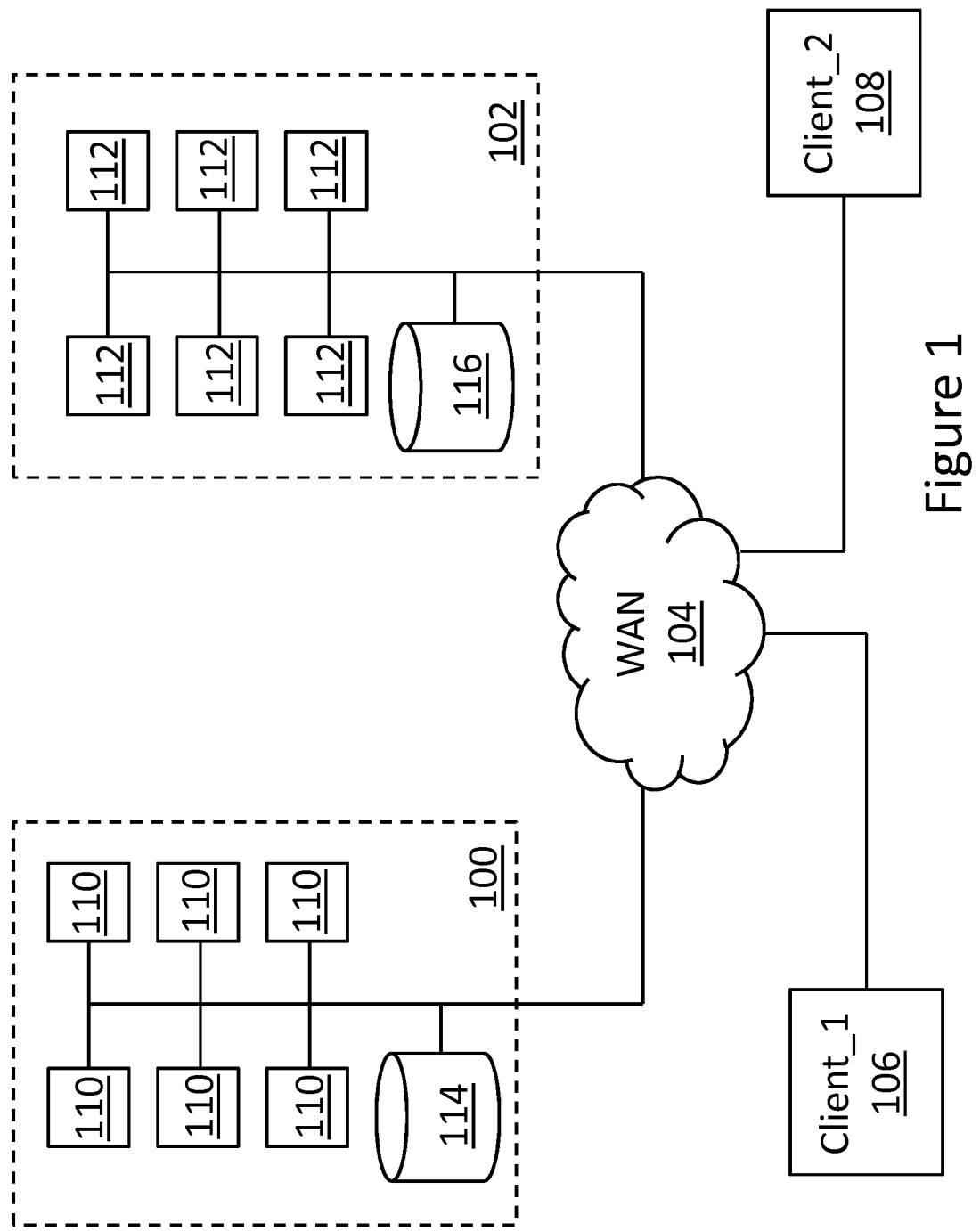
FIG. 1 is a simplified diagram showing a known cloud computing system.

Referring to FIG. 1, shown is a simplified diagram of a prior art cloud computing system. The system that is depicted in FIG. 1 is typical of known cloud computing systems, such as for instance the Amazon® Web Services (AWS) system. A first data center 100 and a second data center 102 are coupled to a Wide Area Network (WAN) 104, such as for instance the Internet. A first user system (Client_1) 106 and a second user system (Client_2) 108 are also coupled to the WAN 104. In the interest of clarity, various known components of the WAN 104 and of the communication systems through which the data centers 100 and 102 and the user systems 106 and 108 connect to the WAN are not shown in FIG. 1. Further, various systems that are necessary for the operation of the data centers 100 and 102, such as for instance cooling systems, power distribution systems, etc., are not shown in FIG. 1.

Each data center 100 and 102 includes a plurality of servers 110 and 112, respectively. The servers 110 are on a Local Area Network (LAN) at data center 100 and the servers 112 are on a Local Area Network (LAN) at data center 102. Additionally, each data center 100 and 102 includes mass storage devices, represented generally at 114 and 116, respectively. The servers 110 and mass storage 114 are maintained and serviced using not shown cooling and power distribution systems, personnel, etc. located at data center 100, whilst the servers 112 and mass storage 116 are maintained and serviced using not shown cooling and power distribution systems, personnel, etc. located at data center 102. For simplicity, it is assumed that data center 100 and data center 102 are located within a same region, and that a task provided from Client_1 or from Client_2 may be handled by either the data center 100 or the data center 102. Alternatively, the data centers and/or the user systems are located within different regions.

Referring still to FIG. 1, during use Client_1 provides a task via WAN 104 to a cloud-computing provider. The cloud-computing provider is implemented on a not illustrated server coupled to the WAN 104, or on the servers of one or both of data centers 100 and 102. The task is routed to an appropriate data center to be executed. For instance, the task is directed to data center 100 and appropriate processing and/or storage resources are allocated within data center 100 for executing the task. Client_1 is billed for execution of the task based on processing and/or storage resources consumed. Alternatively, the task is routed to data center 102. Further alternatively, Client_2 provides a task, which is routed to either data center 100 or data center 102. As will be apparent, providing data center 100 and data center 102 within the same region increases the cloud-computing provider's flexibility to route tasks from the same user, or from multiple users, based on the amount of resources that are required to execute the task and the amount of resources that are currently available at any given data center. Further, if there is a service interruption at one of the data centers 100 or 102 then the cloud-computing provider may direct tasks to the other one of the data centers 100 or 102. Unfortunately, it is very costly to establish and operate multiple dedicated data centers, and even with such redundancy it is not possible to eliminate service interruptions entirely.

Figure 2:
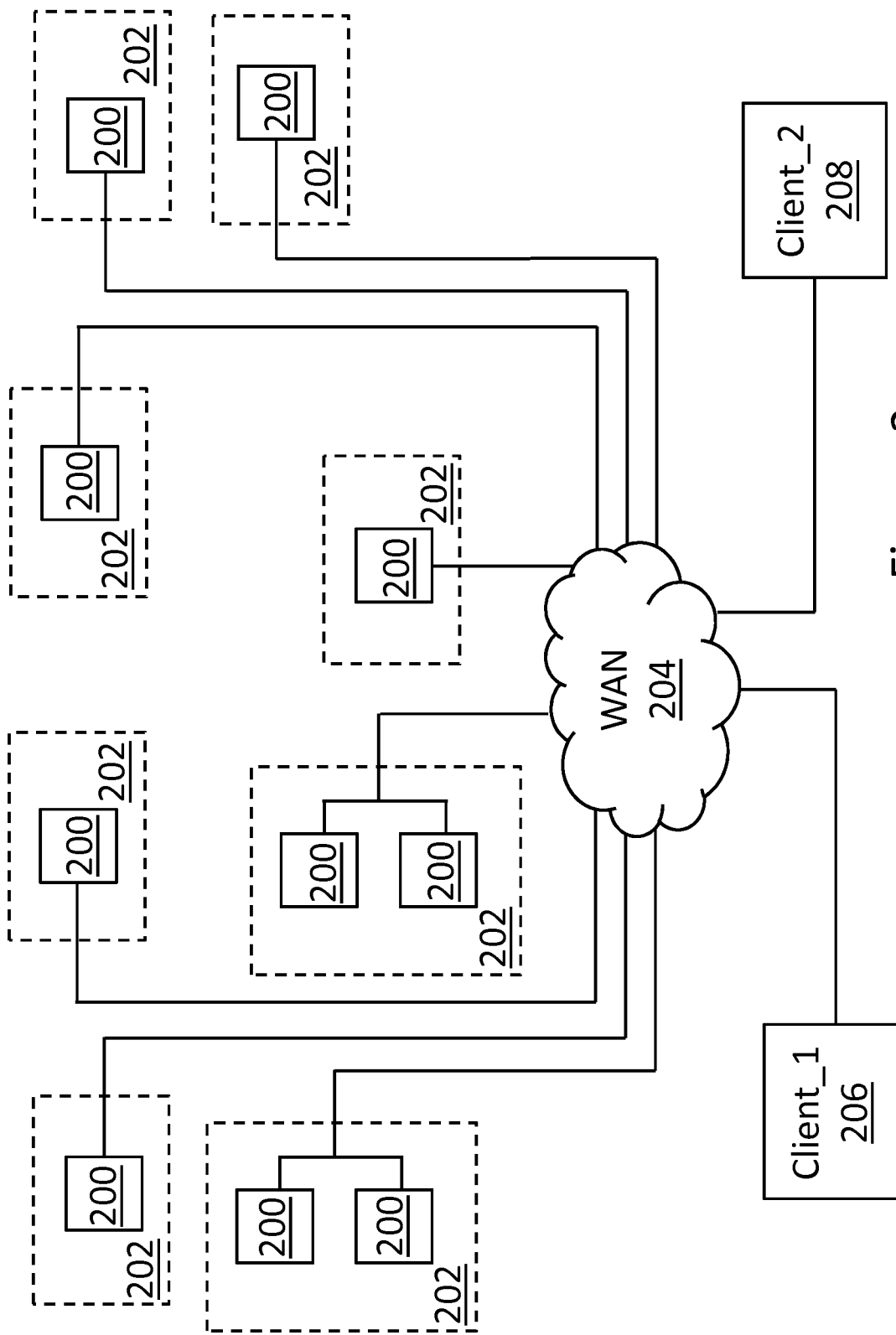
FIG. 2 is a simplified diagram showing a cloud computing system according to an embodiment of the invention.

Referring now to FIG. 2, shown is a simplified diagram of a cloud computing system in accordance with an embodiment of the invention. Each one of a plurality of subscribers to a content delivery service is provided with a consumer electronic device 200, which is disposed at a location associated with the subscriber. Optionally, some locations are provided with a plurality of consumer electronic devices 200, for instance to support different content delivery services or to support plural subscribers located at a same location. Each of the consumer electronic devices 200 is connected to Wide Area Network (WAN) 204, via a known data communication technology, such as for instance an asymmetric digital subscriber line. A first user system (Client_1) 206 and a second user system (Client_2) 208 are also coupled to the WAN 204. In the interest of clarity, various known components of the WAN 204 and of the communication systems through which the consumer electronic devices 200 and the user systems 206 and 208 connect to the WAN are not shown in FIG. 2.

In the present embodiment, the content delivery service is an Internet Protocol TV (IPTV) service, and the consumer electronic device 200 is a set-top box (STB) that is installed in each subscriber's home 202 for receiving media content via WAN 204, the media content for being displayed to the respective subscriber via a television or other similar device. Alternatively, the consumer electronic devices 300 and 304 are any type of pass-through box associated with a service that provides for instance cable television signals, satellite television signals, over the air television signals, etc., to the subscribers. A STB typically is an embedded PC with a processor and memory capable of decoding MPEG-2 or MPEG-4 encoded video, or video that is encoded using other codecs e.g., H.264 or H.265 etc., and simultaneously capable of dealing with the processor overhead relating to enforced encryption, etc. The duty of presenting the program guide and acting on input events from a user are small compared to the STB primary duties, i.e., digital signal processing. Optionally, the consumer electronic device 200 supports other content delivery services, such as for instance full web browser HTML and HTML5 service, either in addition to or instead of supporting the IPTV service.

Figure 3:
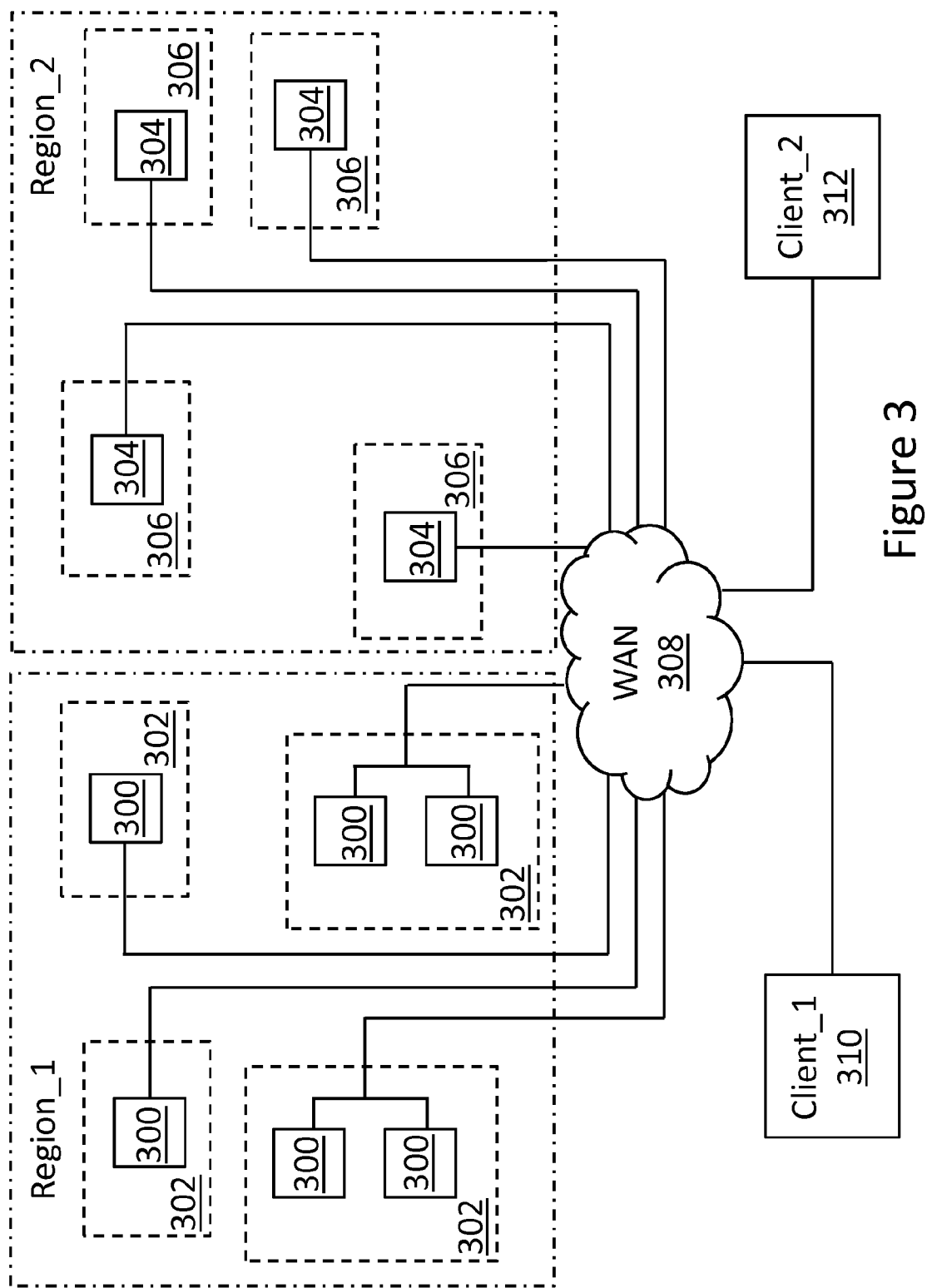
FIG. 3 is a simplified block diagram showing components of a consumer electronic device.

Referring now to FIG. 3, shown is a simplified diagram of a cloud computing system in accordance with another embodiment of the invention. The system of FIG. 3 is similar to the system of FIG. 2, but each of the consumer electronic devices 300 and 304 is assigned to one of two different regions, Region_1 or Region_2. In particular, devices 300 are disposed within locations 302 that are grouped together to form Region_1 and devices 304 are disposed within locations 306 that are grouped together to form Region_2. The locations 302 are not necessarily all co-located within a defined geographical area, and similarly the locations 306 are not necessarily all co-located within a defined geographical area. For instance, the definition of different regions may be logical rather than geographic in nature. That being said, for reasons relating to network efficiency, it is preferable for the devices 300 or 304 within a same region to be located within a relatively small geographical area, such as for instance within a same city or within a same state/province/country. Assigning the devices 300 and 304 to different regions supports geo-diversity/control, political diversity/control, and even seismic diversity etc. resulting in stronger disaster recovery capabilities. Advantageously, geo-diversity and/or political diversity control supports the storage and/or processing of data in a way that can ensure compliance with export restrictions or other similar limitations on the movement of data, such as for instance preventing sensitive research data from being stored or processed using resources that are located within black-listed countries, etc.

Referring still to FIG. 3, a first user system (Client_1) 310 and a second user system (Client_2) 312 are also coupled to the WAN 308. In the example that is shown in FIG. 3 it is assumed that Client_1 is in Region_1 and that Client_2 is in Region_1. Alternatively Client_1 and Client_2 are both in either Region_1 or Region_2, or Client_1 is in Region_2 and Client_2 is in Region_1. In the interest of clarity, various known components of the WAN 308 and of the communication systems through which the consumer electronic devices 300 and 304 and the user systems 310 and 312 connect to the WAN are not shown in FIG. 3.

In the present embodiment, the content delivery service is an Internet Protocol TV (IPTV) service, and the consumer electronic devices 300 and 304 are set-top boxes similar to the one that is described with reference to FIG. 2. Alternatively, the consumer electronic devices 300 and 304 are any type of pass-through box associated with a service that provides for instance cable television signals, satellite television signals, over the air television signals, etc., to the subscribers. Optionally, the consumer electronic devices 300 and/or 304 support other content delivery services, such as for instance full web browser HTML and HTML5 service, either in addition to or instead of supporting the IPTV service.

Figure 4:
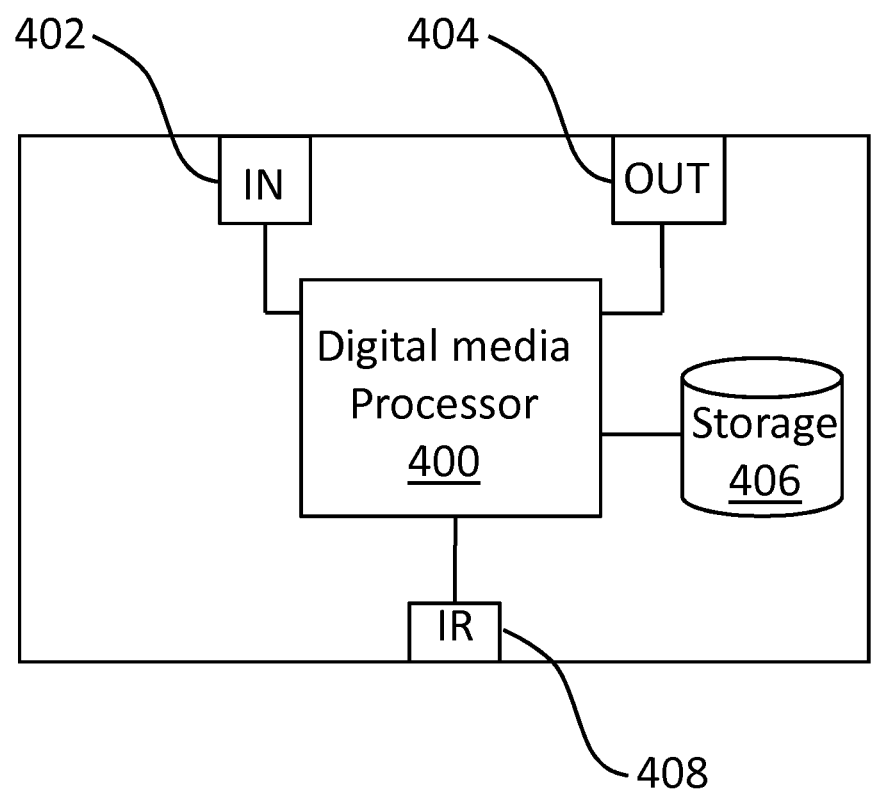
FIG. 4 is a simplified diagram showing a cloud computing system according to an embodiment of the invention.

FIG. 4 is a simplified block diagram showing various components of the consumer electronic device 200, 300, 304, e.g., an Internet Protocol TV (IPTV) set top box (STB) for a subscription-based IPTV content delivery service. In this specific and non-limiting example, the STB includes a digital media processor 400 for processing data packets that are transmitted over a WAN and received at input interface 402. The digital media processor 400 comprises one or more processors for extracting data packets and for processing the resulting transport stream. The digital media processor 400 optionally is dedicated, i.e. a field programmable gate array (FPGA), central processing unit (CPU), graphics processor unit (GPU), hard codecs, etc. Processing the transport stream includes functions such as decoding, error correction, descrambling, and extracting of a specific program stream as selected by a user. The program stream is then divided into its elementary streams (video, audio and control), which are supplied to a compositor 404 to create a signal to be sent to a television or other similar device. The STB further includes storage 406, such as for instance a hard disk drive (HDD) or a solid-state memory or flash memory device. The capacity of storage 406 optionally is in the terabyte (TB) range or higher. Storage 406 supports personal video recorder (PVR) functionality, and/or stores the firmware and other software that is required to operate the STB. Optionally, the STB includes a sensor 408, e.g., an Infrared sensor, for receiving control signals from a user remote control device having a complementary transmitter. Further optionally, auxiliary processing and/or storage components (not shown) unrelated to the subscription-based content delivery service are provided within the STB.

The STB includes a finite amount of processing resources within the digital media processor 400 (and the optional auxiliary processing component if present), as well as a finite amount of storage resources within storage 406 (and the optional auxiliary storage component if present). More of the processing resources and/or storage resources are used during certain periods of time, such as for instance when the subscriber to the content delivery service is watching a program, than during other periods of time, such as for instance when at the subscriber is not watching a program. Depending on the resources that are provided within the STB, and the nature of the program that is being watched, some of the processing resources and/or storage resources may remain unused or available, even when the subscriber is watching a program. During any given day, there are expected to be blocks of time when the subscriber will not use the STB to access programs via the content delivery service. For instance, it is expected that most subscribers will not view programs during daytime work hours and during the late night through early morning hours. During such periods of inactivity, which may be mapped to each subscriber by monitoring viewing activity over a period of days or weeks, the processing resources and storage resources of the STB are underutilized. The systems that are shown in FIG. 2 and FIG. 3 allow tasks to be performed for other users unrelated to the subscriber, such as for instance Client_1 or Client_2, using the underutilized STB processing resources and/or storage resources. Each consumer electronic device 200 in FIG. 2, or consumer electronic device 300 or 304 in FIG. 3, is a STB similar to the one that is shown in FIG. 4. Of course, different STB models may be provided to different subscribers, such as for instance during the roll-out of new models or when different models are offered to subscribers at different costs, etc. Since the processing and storage characteristics of the different models are known, the instantaneous amount of unused processing resources and/or storage resources for any STB may be determined based on knowledge of the program requested by a subscriber associated with that STB.

Referring again to the system that is shown in FIG. 2, a cloud-computing provider, i.e. a broker of cloud-computing resources, coordinates the delivery of tasks from Client_1 and/or from Client_2 to one or more of the consumer electronic devices 200. In this specific and non-limiting example the cloud-computing provider is also the provider of the content delivery service. Optionally, the cloud-computing provider is also the provider of Internet service to the subscriber. Alternatively, the cloud-computing provider (broker), the provider of the content delivery service and the Internet service provider are separate entities.

The cloud-computing provider maintains a not illustrated server system that is connected to WAN 204, or alternatively the cloud-computing provider maintains a virtual server system that is itself distributed across the consumer electronic devices 200. The cloud-computing provider tracks the processing resources and/or storage resources that are available on each of the consumer electronic devices, which are always connected to the WAN and in communication with the cloud-computing provider. When a task is received from Client_1 or from Client_2, the cloud-computing provider determines one or more of the consumer electronic devices 200 having sufficient available processing resources and/or storage resources to execute the task, and subsequently provides the task to the one or more of the consumer electronic devices 200 for execution thereon. As such, each of the one or more consumer electronic devices 200 optionally performs only a portion of the task. Upon completion of the task, the cloud-computing provider returns a result to the task provider Client_1 or Client_2, and creates a billing/ activity tracking record, which optionally includes providing an invoice to the task provider based on the amount of resources of the one or more of the consumer electronic devices 200 consumed during execution of the task. Optionally, executing of a task occurs during a period of time that overlaps with, or that is in parallel with, delivery of content to the one or more of the consumer electronic devices 200. When the task is performed in parallel with the primary function of the STB, e.g., during delivery of content to the subscriber associated with the STB, then performing the primary function has priority over performing the task. Alternatively, executing of a task occurs only during "idle time" when content is not being delivered to the one or more of the consumer electronic devices 200.

As will be apparent, some tasks may be performed using the resources of only a single consumer electronic device 200, or using the resources of a plurality of consumer electronic devices 200 cooperatively. For instance, storage of a small amount of user data or certain processing tasks may be performed using the resources of only a single consumer electronic device 200. On the other hand, storage of large amounts of data, storage of data according to a RAID process, or processing intensive tasks may require the resources of a plurality of consumer electronic devices 200. As such, it is not a requirement that any single STB is capable of performing an entire processing or storage task by itself.

Other optional features of the system that is shown in FIG. 2 include using different security protocols to transmit and/or store data relating to the content delivery service and user data relating to a provided task. For instance, data relating to television programming is transmitted to consumer electronic devices 200 via WAN 204 and stored on consumer electronic devices 200 in accordance with a first security protocol that is suitable in an IPTV ecosystem. User data, which is not associated with the content delivery service to which the subscribers subscribe, is transmitted to consumer electronic devices 200 via WAN 204 and stored on consumer electronic devices 200 in accordance with a second security protocol that is suitable in a cloud-computing ecosystem. The subscribers are unable to access the user data, and in fact the subscribers preferably are not even aware that a task is being executed at any given time.

Other optional features of the system that is shown in FIG. 2 relate to the distribution and implementation of the tasks that are provided to the consumer electronic devices 200. In one implementation, the cloud-computing provider transmits a network bundle including an operating system, an environment, an application to be executed and data to be processed. By providing a network bundle including all of the above-noted components, it is possible to execute different tasks on the consumer electronic devices 200 at different time. Of course, providing network bundles for each task consumes an undesirably large amount of network bandwidth. Alternatively, the operating system, environment and network platform are installed on the consumer electronic devices 200 and only the necessary application and data is provided each time a task is to be performed. Such batch processing reduces the network bandwidth problem but limits the types of tasks that can be performed using the consumer electronic devices 200.

In sum, the cloud-computing provider or broker coordinates flow of data including receipt of the task from a requestor (e.g., Client_1 or Client_2), delivery of the task to one or more consumer electronic devices 200 for execution thereon, receipt of a result of executing the task, and providing the result back to the requestor. Optionally, the flow of data is direct between the one or more consumer electronic devices 200 and the requestor (Client_1 or Client_2). Further, the cloud-computing provider monitors and logs cloud service operations and invoices the requestor based on the resources that are consumed during executing of the task. In the system of FIG. 2, tasks are performed for the requestor using processing and/or storage resources that are outside of the processing and/or storage resources of the requestor. That is to say, the tasks are performed for the requestor using the processing and/or storage resources associated with one or more subscribers to the content delivery service. The invoicing, by the cloud-computing provider, is to other than the subscribers to the content delivery service.

The system that is shown in FIG. 2 provides considerable flexibility in the provisioning of cloud-based computing services, and supports a broker-mediated cloud-computing environment. In particular, the nature of a processing task may be taken into account when providing the task to the devices 200. For instance, a highly parallelized process may be provided to any of the available devices 200 without regard to the processing speed thereof, and a highly serialized process may be provided to the available devices 200 that offer the fastest processing speed. The nature of a storage task may also dictate whether data is stored entirely within one device 200, or within a plurality of devices 200 using a RAID process or another similar process. In the system that is shown in FIG. 2, the locations 202 may be distributed across different countries and even across different continents. The nature of the storage task may dictate that the data cannot be stored within devices 200 that are located within certain specified countries or regions. Similarly, certain processing tasks may place restrictions on the countries in which the devices 200 can be located.

Cloud-computing services that are provided using the system of FIG. 2 can be implemented in a highly elastic fashion, since tasks may be distributed across a large number of devices 200. As the number of subscribers to the content delivery service grows, so too does the number of available devices 200. In order to incent new subscribers to join the service, and thereby increase the available processing resources and storage resources, the content delivery service provider optionally provides the devices 200 to subscribers without charge. The cost of the devices 200 is recovered over time as the available processing resources and/or available storage resources are used to perform tasks for other clients. Once the initial cost of installing the devices 200 has been recovered, the ongoing cost of implementing the system of FIG. 2 is small. In particular, each subscriber pays for the electricity that is required to power the device 200 even when tasks are being performed for other clients. Further, the devices 200 do not require cooling systems or other infrastructure that are required in traditional data centers. Once deployed, the system that is shown in FIG. 2 has a low cost of ownership and is highly scalable and elastic. Optionally, a portion of the invoiced amount is credited back to the subscribers as payment for making the resources of their device 200 available for performing other tasks. Further optionally, the service and/or equipment is offered at a reduced price based on anticipated revenues.

The system that is shown in FIG. 3 similarly provides considerable flexibility in the provisioning of cloud-based computing services, within each of a plurality of distinct regions. In addition to the features and advantages that are discussed with reference to FIG. 2, the system that is shown in FIG. 3 also provides redundancy by supporting storage of the same data in different regions for being accessed by clients within the same region. Further, network efficiency is improved since tasks that are received from a client in one region are routed to devices 300 or 304 within the same region.

Figure 5:
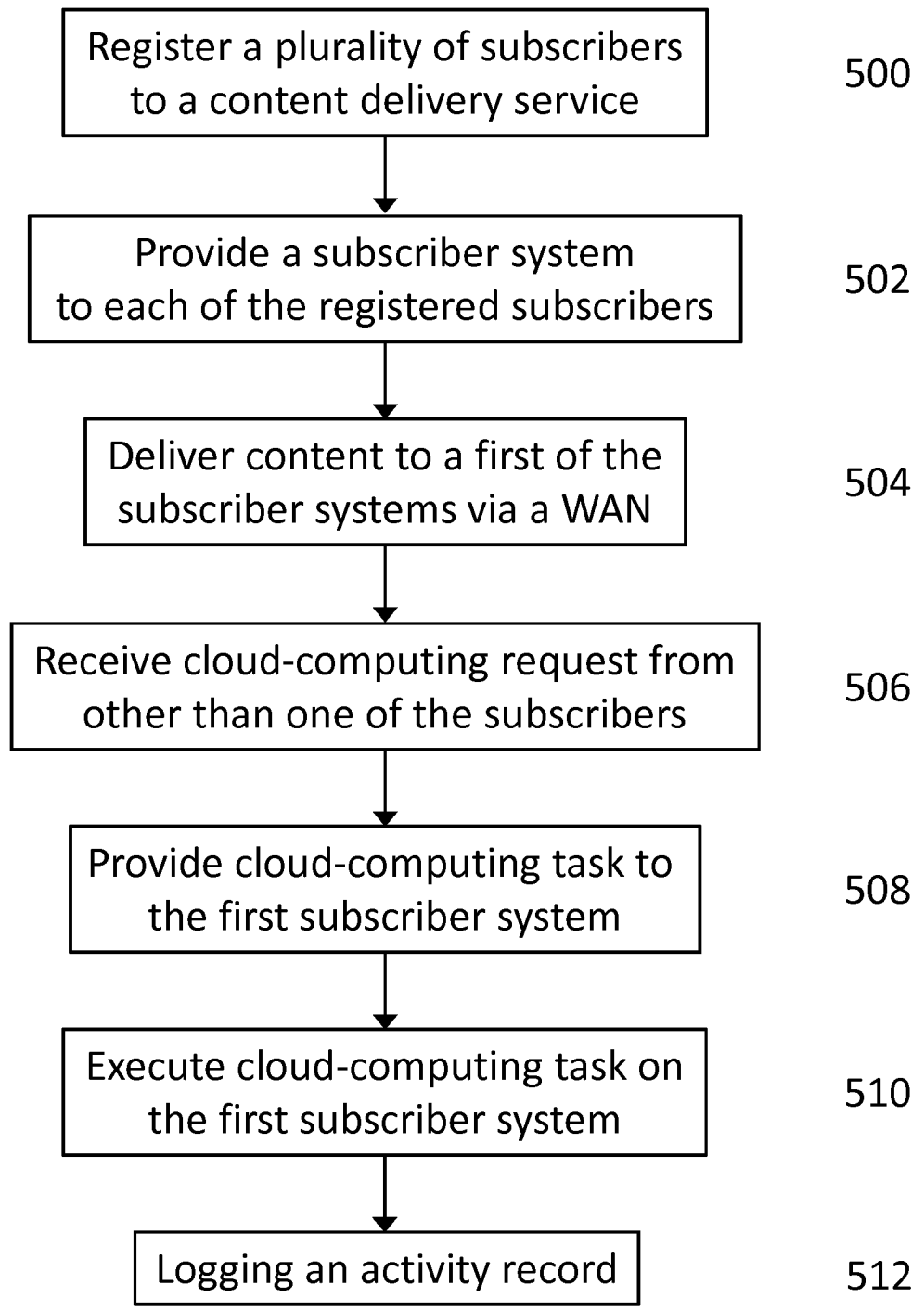
FIG. 5 is a simplified flow diagram for a method according to an embodiment of the invention.

Referring now to FIG. 5, shown is a simplified flow diagram for a method according to an embodiment of the invention. At 500 a plurality of subscribers is registered to a content delivery service. The content delivery service optionally is one or more of an IPTV service and an Internet service. Registering optionally includes signing each of the subscribers to a fixed-term contract or to a month-to-month contract. At 502, for each registered subscriber, the content delivery service provides a subscriber system at a location that is associated with the subscriber. For instance, the subscriber system is provided at the subscriber's residence and is coupled to a Wide Area Network (WAN), such as for instance via an asymmetric digital subscriber line. The provided subscriber system comprises at least one of a processing resource and a non-volatile storage resource for use in providing the content delivery service. At 504 content is delivered to a first subscriber system via the WAN. The content is delivered in response to a content delivery request received from a first subscriber, such as for instance selection of a program from a program guide using a remote control device or navigating to a specified web page using a browser. The delivery of the content, and processing of the delivered content for being displayed via a television or other similar device, consumes a portion of the at least one of the processing resource and the non-volatile storage resource of the first subscriber system. In this specific and non-limiting example the content delivery service provider is also a cloud-computing provider or a cloud-computing broker. Optionally, the content delivery service provider is also an Internet service provider. Alternatively, the cloud-computing provider (broker), the content deliver service provider and the Internet service provider are separate entities.

At 506 a cloud-computing task is received, the task being other than in accordance with the content delivery service and other than originating from any subscribers of the plurality of subscribers. For instance, the task originates from Client_1 or Client_2 in FIG. 2 or 3. Optionally, the task is received from a subscriber for execution other than by the subscriber's system. At 508 the task is provided to the first subscriber system. Providing the task to the first subscriber system includes making a determination that the first subscriber system has an available portion of the at least one of the processing resource and the non-volatile storage resource that is sufficient to execute the task. Optionally, the task is provided to the first subscriber during a period of time in which content is not being delivered by the content delivery service—idle time. During idle time nearly all of the at least one of the processing resource and the non-volatile storage resource is available to be used for other tasks. Alternatively, the task is provided to the first subscriber during a period of time in which content is being delivered by the content delivery service. In this latter case, a significant portion of the at least one of the processing resource and the non-volatile storage resource is being consumed to deliver the content, but unused resources are still available to be used for other tasks. At 510 the task is executed on the first subscriber system, using the unused at least one of the processing resource and the non-volatile storage resource thereof. Upon completion of the task, at 512 an activity record is logged. Optionally, logging an activity record includes invoicing for execution of the task based on an amount of the available or unused portion of the at least one of the processing resource and the non-volatile storage resource consumed during execution of the task. The invoicing is to other than the first subscriber, e.g., to Client_1 or Client_2 in FIG. 2 or 3.

Figure 6:
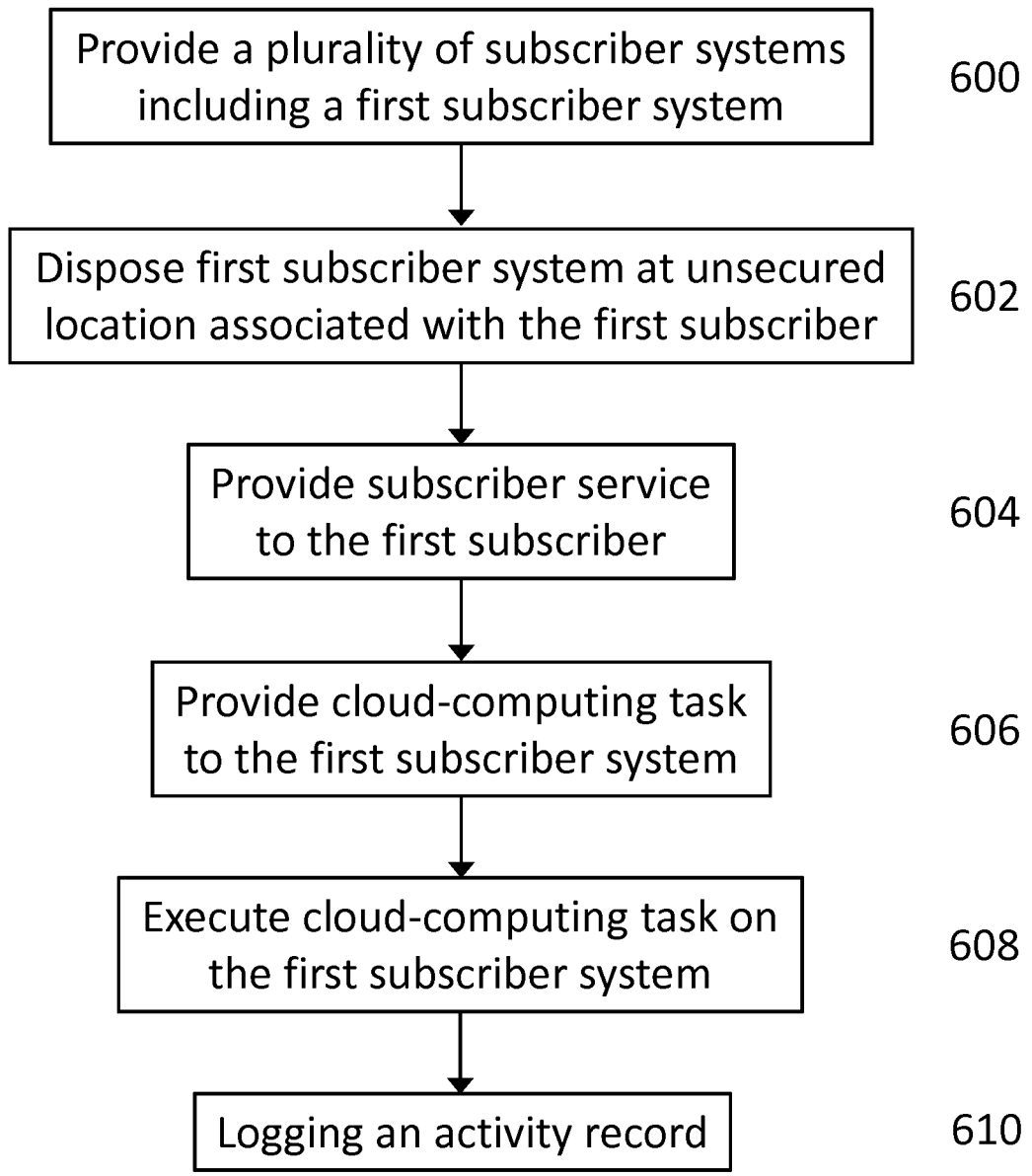
FIG. 6 is a simplified flow diagram for another method according to an embodiment of the invention.

Referring now to FIG. 6, shown is a simplified flow diagram for a method according to an embodiment of the invention. At 600 a plurality of subscriber systems is provided, including a first subscriber system, the subscriber systems being coupled via a Wide Area Network (WAN). The first subscriber system comprises processing and non-volatile storage and is suitably programmed for providing a subscriber service to a first subscriber. At 602 the first system is disposed in an unsecured location, the unsecured location associated with the first subscriber. For instance, the first subscriber system is disposed in the first subscriber's residence. In this context, the term unsecured implies that no special measures are provided to provide security to the subscriber system in addition to the pre-existing door locks and/or alarm systems that already exist at the location associated with the first subscriber. At 604 the subscriber service is provided to the first subscriber, e.g., requested content available via the subscriber service is provided to the first subscriber. The requested content is delivered in response to a content delivery request received from the first subscriber, such as for instance by selection of a program from a program guide using a remote control device. At 606 a cloud-computing task is provided to the first subscriber system via the WAN. The cloud-computing task comprises, for instance, at least one of processing and storage of user data, the user data unrelated to the subscriber service. At 608 the cloud-computing task is executed on the first subscriber system, using an amount of at least one of the processing and non-volatile storage thereof. Upon completion of the task, at 610 an activity record is logged. Optionally, logging an activity record includes invoicing for execution of the task based on the amount of at least one of the processing and the non-volatile storage consumed on the first subscriber system during execution of the task. The invoicing is to other than the first subscriber, e.g., to Client_1 or Client_2 in FIG. 2 or 3. Optionally, all processing tasks are obfuscated to maintain security of the overall process even when executed in unsecure locations. For example, data to be stored is encrypted to ensure that access to the physical media dose not provide access to the data, or only a portions of the entire algorithm is executed on the first subscriber system, etc.

Figure 7:
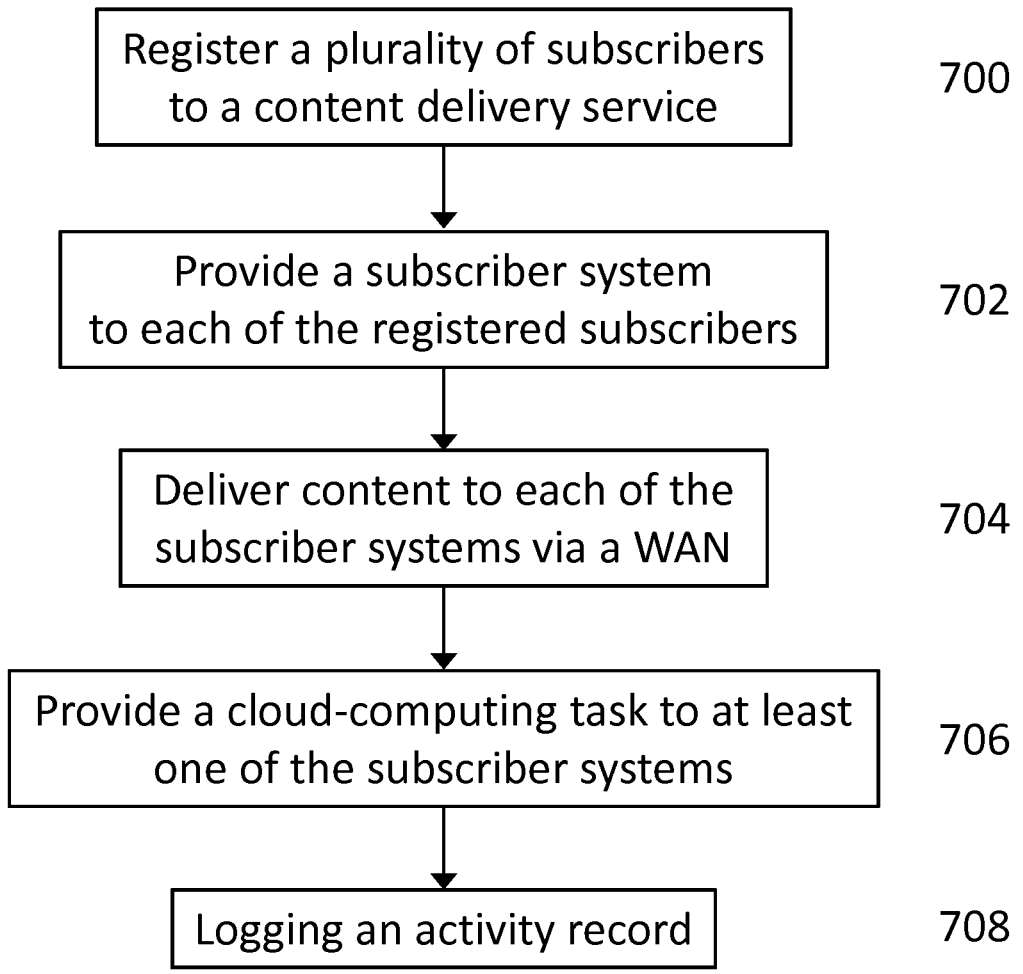
FIG. 7 is a simplified flow diagram for another method according to an embodiment of the invention.

Referring now to FIG. 7, shown is a simplified flow diagram for a method according to an embodiment of the invention. At 700 a plurality of subscribers is registered to a content delivery service. Registering optionally includes signing each of the subscribers to a fixed-term contract or to a month-to-month contract. At 702, for each registered subscriber, the content delivery service provides a subscriber system at a location that is associated with the subscriber. For instance, the subscriber system is provided at the subscriber's residence and is coupled to a Wide Area Network (WAN), such as for instance via an asymmetric digital subscriber line. The provided subscriber system comprises at least one of a processing resource and a non-volatile storage resource for use in providing the content delivery service. At 704 content is delivered to each subscriber system in accordance with the content delivery service. In particular, delivering content comprises providing data relating to the content delivery service to each subscriber system via the WAN and according to a first security protocol. In this specific and non-limiting example the content delivery service provider is also a cloud-computing provider or a cloud-computing broker. Optionally, the content delivery service provider is also an Internet service provider. Alternatively, the cloud-computing provider (broker), the content deliver service provider and the Internet service provider are separate entities.

At 706 a cloud-computing task is provided to at least one of the subscriber systems. In this example, the step of providing the cloud-computing task comprises determining at least one subscriber system having a sufficient amount of the at least one of the processing resource and the non-volatile storage resource available to execute the cloud-computing task. Cloud-computing task data are then provided to the at least one subscriber system via the WAN and according to a second security protocol. Upon completion of the cloud-computing task, at 708 an activity record is logged. Optionally, logging an activity record includes invoicing for execution of the cloud-computing task based on an amount of the available portion of the at least one of the processing resource and the non-volatile storage resource that is consumed during execution of the cloud computing task. The invoicing is to other than a subscriber associated with the at least one of the subscriber systems, e.g., to Client_1 or Client_2 in FIG. 2 or 3.

The various consumer electronic devices cooperate to form virtual data centers, which are distributed geographically within known regions. Various specific applications may be envisioned for such virtual data centers. For instance, the distributed data centers may be used for applications including distributed rendering, distributed analytics processing, testing and development running parallel instances, etc.

In one very specific application the virtual data centers may be used for the distributed back-up of virtual or real storage area networks (SANs) within real data centers. Distributed back-up of a virtual SAN provides additional redundancy, and may be used for disaster recovery purposes, etc.

Optionally, data that is provided for distributed storage on the consumer electronic devices may also be cached at a control center. For instance, as data enters through the service portal an image of the data is captured and stored on a server. The data that is stored on a server may be used when a data-retrieval request is received, such that the data can be provided to the requestor without the delay that is associated with reassembling the data from the distributed storage. Optionally, the data that is stored on the server may be substantially permanently stored, such as for instance as part of a premium subscription service, or the data that is stored on the server may be stored until it "ages" and is removed. For instance, the data may be removed from the server after a predetermined period of time has passed without receiving a request for the retrieval of that data.

Further, alternative hypervisors may be layered on top of the virtual data centers to create different compatibilities. By way of an example, *Eucalyptus* may be layered on top of the virtual data centers to emulate Amazon Web Services in the virtual data center.

In another optional variant, excess processing and/or storage resources on the consumer electronic devices 200, 300, 304 may be used to accelerate in software and thereby enhance native codecs on the devices to extend their life and capabilities. By way of an example, the devices 200, 300, 304 are set-top boxes with hard-wired codecs for 1080p television programming Software codecs may be used to extend the 1080p codecs to provide 4K Ultra HD capabilities. Such a process is transparent to the subscriber.

In some embodiments, the consumer electronic devices 200, 300, 304 are located within a relatively small geographic area, such as for instance a neighborhood or a Multi-Dwelling Unit (MDU) such as for instance a hospital, a hotel, a condominium building, a rental apartment building, a retirement home or an extended care facility. In such embodiments, an operational point of presence (OP-POP) may be located within the IP network serving the devices. For instance, a centrally located server may be provided within the basement of a hotel (or other MDU) and be accessible to the devices that are provided within each guest room of that hotel. In this way, a cloud-computing provider may provide updates to the OP-POP via a wide area network (WAN) and then the updates may be provided to each of the devices via a local area network (LAN). Such an arrangement avoids the need to establish separate streams between the cloud-computing provider and each device via the WAN, thereby reducing data traffic on the WAN. Optionally, data-intensive content such as for instance 4K Ultra HD television programming may be provided to the OP-POP via the WAN and then subsequently distributed via the LAN to the various devices within the hotel (or other MDU).

Numerous other embodiments may be envisaged without departing from the scope of the present invention.

What is claimed is:

1. A method comprising:
registering a plurality of subscribers to a content delivery service;
for each registered subscriber providing at a location associated therewith a subscriber system, each of the subscriber systems coupled to a Wide Area Network (WAN) and comprising at least one of a processing resource and a non-volatile storage resource;
delivering content to a first subscriber system in accordance with the content delivery service, thereby consuming a portion of the at least one of the processing resource and the non-volatile storage resource of the first subscriber system;
receiving a task that is other than in accordance with the content delivery service;
providing the task to the first subscriber system, the first subscriber system having an available portion of the at least one of the processing resource and the non-volatile storage resource that is sufficient to execute the task;
executing the task on the first subscriber system; and
logging an activity record for the execution of the task based on an amount of the available portion of the at least one of the processing resource and the non-volatile storage resource consumed during execution of the task,
wherein the content delivery service is provided by a content delivery service provider, and wherein a cloud-computing broker other than the content delivery service provider performs the following:
receiving the task from a requestor;
providing the task to the first subscriber system; and
logging the activity record for the execution of the task based on the amount of the available portion of the at least one of the processing resource and the non-volatile storage resource consumed during execution of the task.

2. The method according to claim 1 wherein delivering content to the first subscriber system via the WAN is performed in response to a request received from a first subscriber associated with the first subscriber system.

3. The method according to claim 2 wherein logging the activity record comprises invoicing to other than the first subscriber.

4. The method according to claim 3 wherein invoicing to other than the first subscriber comprises invoicing to other than any subscriber of the plurality of subscribers.

5. The method according to claim 1 wherein the content delivery service is an Internet Protocol TV (IPTV) service, and wherein each of the subscriber systems is a set top box (STB).

6. The method according to claim 1 wherein the content delivery service is a web browser HTML and HTML5 service.

7. The method according to claim 1 wherein delivering content to the first subscriber system via the WAN is performed during a first period of time and wherein executing the task on the first subscriber system is performed during a second period of time that at least partially overlaps with the first period of time.

8. The method according to claim 1 wherein delivering content to the first subscriber system via the WAN is performed during a first period of time and wherein executing the task on the first subscriber system is performed during a second period of time that other than overlaps with the first period of time.

9. The method according to claim 2 wherein the task comprises storage of user data other than data associated with the content delivery service and other than data associated with the first subscriber.

10. The method according to claim 9 comprising storing at least a portion of the user data in the non-volatile storage resource of the first subscriber system.

11. The method according to claim 1 wherein the task comprises processing of user data other than data associated with the content delivery service.

12. A method comprising:
registering a plurality of subscribers to a content delivery service;
for each registered subscriber providing at a location associated therewith a subscriber system, each of the subscriber systems coupled to a Wide Area Network (WAN) and comprising at least one of a processing resource and a non-volatile storage resource;
delivering content to a first subscriber system in accordance with the content delivery service, thereby consuming a portion of the at least one of the processing resource and the non-volatile storage resource of the first subscriber system;
receiving a task that is other than in accordance with the content delivery service;
providing the task to the first subscriber system, the first subscriber system having an available portion of the at least one of the processing resource and the non-volatile storage resource that is sufficient to execute the task;
executing the task on the first subscriber system; and
logging an activity record for the execution of the task based on an amount of the available portion of the at least one of the processing resource and the non-volatile storage resource consumed during execution of the task,
wherein delivering content to the first subscriber system via the WAN is performed in response to a request received from a first subscriber associated with the first subscriber system,
wherein the task comprises storage of user data other than data associated with the content delivery service and other data associated with the first subscriber, and comprising storing at least a portion of the user data in the non-volatile storage resource of the first subscriber system, wherein data associated with the content delivery service is stored in the non-volatile storage resource of the first subscriber system in accordance with a first security protocol and wherein the at least a portion of the user data is stored in the non-volatile storage resource of the first subscriber system in accordance with a second security protocol.

13. The method according to claim 12 wherein the content delivery service is provided by a content delivery service provider, the content delivery service provider performing the following:
receiving the task from a requestor;
providing the task to the first subscriber system; and
logging the activity record for the execution of the task based on the amount of the available portion of the at least one of the processing resource and the non-volatile storage resource consumed during execution of the task.

14. The method according to claim 12 wherein the content delivery service is provided by a service provider, the service provider also for coordinating receipt of the task from a requestor and for providing the task to the first subscriber system.

15. A method comprising:
registering a plurality of subscribers to a content delivery service;
for each registered subscriber providing at a location associated therewith a subscriber system, each of the subscriber systems coupled to a Wide Area Network (WAN) and comprising at least one of a processing resource and a non-volatile storage resource;
delivering content to a first subscriber system in accordance with the content delivery service, thereby consuming a portion of the at least one of the processing resource and the non-volatile storage resource of the first subscriber system;
receiving a task that is other than in accordance with the content delivery service;
providing the task to the first subscriber system, the first subscriber system having an available portion of the at least one of the processing resource and the non-volatile storage resource that is sufficient to execute the task;
executing the task on the first subscriber system; and
logging an activity record for the execution of the task based on an amount of the available portion of the at least one of the processing resource and the non-volatile storage resource consumed during execution of the task,
wherein delivering content to the first subscriber system via the WAN is performed in response to a request received from a first subscriber associated with the first subscriber system,
wherein the task comprises storage of user data other than data associated with the content delivery service and other than data associated with the first subscriber,
wherein the amount of user data exceeds a storage capacity of the non-volatile storage resource of the first subscriber system, and wherein providing the task to the first subscriber system comprises:
determining a set of subscriber systems having, in aggregate, an available amount of non-volatile storage resource that is sufficient to store the user data; and
storing the user data in the non-volatile storage resources of the subscriber systems of the set of subscriber systems, comprising storing in each of the non-volatile storage resource a portion of the user data.

16. A method comprising:
registering a plurality of subscribers to a content delivery service;
for each registered subscriber providing at a location associated therewith a subscriber system, each of the subscriber systems coupled to a Wide Area Network (WAN) and comprising at least one of a processing resource and a non-volatile storage resource;
delivering content to a first subscriber system in accordance with the content delivery service, thereby consuming a portion of the at least one of the processing resource and the non-volatile storage resource of the first subscriber system;
receiving a task that is other than in accordance with the content delivery service;
providing the task to the first subscriber system, the first subscriber system having an available portion of the at least one of the processing resource and the non-volatile storage resource that is sufficient to execute the task;
executing the task on the first subscriber system; and
logging an activity record for the execution of the task based on an amount of the available portion of the at least one of the processing resource and the non-volatile storage resource consumed during execution of the task,
wherein delivering content to the first subscriber system via the WAN is performed in response to a request received from a first subscriber associated with the first subscriber system,
wherein the task comprises processing of user data other than data associated with the content delivery service and other than data associated with the first subscriber,
wherein processing of the user data requires an amount of processing resources exceeding the available amount of the processing resource of the first subscriber system, and wherein providing the task to the first subscriber system comprises:
determining a set of subscriber systems having, in aggregate, an available amount of processing resource that is sufficient to process the user data; and
processing the user data using the aggregated processing resources of the subscriber systems of the set of subscriber systems.

17. The method according to claim 16 comprising processing at least a portion of the user data using the processing resource of the first subscriber system.

18. A method comprising:
providing a plurality of subscriber systems coupled via a Wide Area Network (WAN) and comprising a first subscriber system, the first subscriber system comprising processing and non-volatile storage and being suitably programmed for providing a subscriber service to a first subscriber;
disposing the first system in an unsecured location, the unsecured location associated with the first subscriber;
providing the subscriber service to the first subscriber;
providing a task to the first subscriber system via the WAN, wherein the task comprises storage of user data other than data associated with the subscriber service and other than data associated with the first subscriber;
executing the task on the first subscriber system; and,
logging an activity record for the execution of the task based on an amount of at least one of the processing and the non-volatile storage consumed on the first subscriber system during execution of the task, wherein the amount of user data exceeds a storage capacity of the non-volatile storage of the first subscriber system, and wherein providing the task to the first subscriber system comprises:
- determining a set of subscriber systems having, in aggregate, an available amount of non-volatile storage that is sufficient to store the user data; and
- storing the user data in the non-volatile storage of the subscriber systems of the set of subscriber systems, comprising storing in each of the non-volatile storages a portion of the user data.

19. The method according to claim 18 wherein logging the activity record comprises invoicing to other than the first subscriber.

20. The method according to claim 19 wherein invoicing to other than the first subscriber comprises invoicing to other than any other subscriber to the subscriber service.

21. The method according to claim 18 wherein the subscriber service is provided by a service provider, the service provider performing the following:
- receiving the task from a requestor;
- providing the task to the first subscriber system; and
- logging the activity record for the execution of the task based on the amount of at least one of the processing and the non-volatile storage consumed on the first subscriber system during execution of the task.

22. The method according to claim 18 wherein the subscriber service is provided by a service provider, the service provider also for coordinating receipt of the task from a requestor and for providing the task to the first subscriber system.

23. The method according to claim 18 wherein the subscriber service is an Internet Protocol TV (IPTV) service, and wherein each of the plurality of subscriber systems is a set top box (STB).

24. The method according to claim 18 wherein providing the subscriber service to the first subscriber is performed during a first period of time and wherein executing the task on the first subscriber system is performed during a second period of time that at least partially overlaps with the first period of time.

25. The method according to claim 18 wherein providing the subscriber service to the first subscriber is performed during a first period of time and wherein executing the task on the first subscriber system is performed during a second period of time that other than overlaps with the first period of time.

26. The method according to claim 18 comprising storing at least a portion of the user data in the non-volatile storage of the first subscriber system.

27. The method according to claim 26 wherein data associated with the subscriber service is stored in the non-volatile storage of the first subscriber system in accordance with a first security protocol and wherein the at least a portion of the user data is stored in the non-volatile storage of the first subscriber system in accordance with a second security protocol.

28. The method according to claim 18 wherein the task further comprises processing the stored user data.

29. A method comprising:
- registering a first plurality of subscribers to a first content delivery service;
- registering a second plurality of subscribers to a second content delivery service;
- for each registered subscriber of the plurality of first subscribers and of the plurality of second subscribers, providing at a location associated therewith a subscriber system, each of the provided subscriber systems coupled to a Wide Area Network (WAN) and comprising at least one of a processing resource and a non-volatile storage resource;
- receiving by a broker system a task that is other than in accordance with the first content delivery service or the second content delivery service;
- providing the task to at least one of the subscriber systems, the at least one of the subscriber systems having an available portion of the at least one of the processing resource and the non-volatile storage resource that is sufficient to execute the task;
- executing the task on the at least one of the subscriber systems; and
- logging an activity record for the execution of the task based on an amount of the available portion of the at least one of the processing resource and the non-volatile storage resource consumed during execution of the task, wherein providing the task to at least one of the subscriber systems comprises providing a first portion of the task to a subscriber system associated with a subscriber of the first plurality of subscribers and providing a second portion of the task to a subscriber system associated with a subscriber of the second plurality of subscribers.

30. A method comprising:
- registering a first plurality of subscribers to a first content delivery service;
- registering a second plurality of subscribers to a second content delivery service;
- for each registered subscriber of the plurality of first subscribers and of the plurality of second subscribers, providing at a location associated therewith a subscriber system, each of the provided subscriber systems coupled to a Wide Area Network (WAN) and comprising at least one of a processing resource and a non-volatile storage resource;
- receiving by a broker system a task that is other than in accordance with the first content delivery service or the second content delivery service;
- providing the task to at least one of the subscriber systems, the at least one of the subscriber systems having an available portion of the at least one of the processing resource and the non-volatile storage resource that is sufficient to execute the task;
- executing the task on the at least one of the subscriber systems; and
- logging an activity record for the execution of the task based on an amount of the available portion of the at least one of the processing resource and the non-volatile storage resource consumed during execution of the task, wherein the first content delivery service is provided by a first content delivery service provider and the second content delivery service is provided by a second content delivery service provider that is other than the first content delivery service provider.

31. The method according to claim 30 wherein one of the first content delivery service provider and the second content delivery service provider is also the broker.

32. A method comprising:
- registering a first plurality of subscribers to a first content delivery service;
- registering a second plurality of subscribers to a second content delivery service;
- for each registered subscriber of the plurality of first subscribers and of the plurality of second subscribers, providing at a location associated therewith a subscriber system, each of the provided subscriber systems coupled to a Wide Area Network (WAN) and comprising at least one of a processing resource and a non-volatile storage resource;

receiving by a broker system a task that is other than in accordance with the first content delivery service or the second content delivery service;

providing the task to at least one of the subscriber systems, the at least one of the subscriber systems having an available portion of the at least one of the processing resource and the non-volatile storage resource that is sufficient to execute the task;

executing the task on the at least one of the subscriber systems; and logging an activity record for the execution of the task based on an amount of the available portion of the at least one of the processing resource and the non-volatile storage resource consumed during execution of the task, wherein both the first content delivery service and the second content delivery service are provided by a same content delivery service provider, and wherein the content delivery service provider is also the broker.

33. A method comprising:

registering a plurality of subscribers to a content delivery service;

for each registered subscriber providing at a location associated therewith a subscriber system, each subscriber system coupled to a Wide Area Network (WAN) and comprising at least one of a processing resource and a non-volatile storage resource;

delivering content to each subscriber system in accordance with the content delivery service, comprising providing data relating to the content delivery service to each subscriber system according to a first security protocol;

providing a task to at least one of the subscriber systems, comprising:

determining a subset of the subscriber systems having in aggregate a sufficient amount of the at least one of the processing resource and the non-volatile storage resource available to execute the task; and delivering data associated with the task to each subscriber system of the determined subset of subscriber systems, comprising providing the data via the WAN and according to a second security protocol, wherein the data provided to any one subscriber system of the determined subset of subscriber systems is insufficient to complete the task; and logging an activity record for the execution of the task based on an aggregated amount of the at least one of the processing resource and the non-volatile storage resource that is consumed during execution of the task.

* * * * *